United States Patent [19]

Erickson

[11] 4,231,773
[45] Nov. 4, 1980

[54] FIBROUS GLASS MANUFACTURE USING REFRACTORY BUSHING

[75] Inventor: Thomas D. Erickson, Newark, Ohio

[73] Assignee: Owens-Corning Fiberglas Corporation, Toledo, Ohio

[21] Appl. No.: 945,734

[22] Filed: Sep. 25, 1978

[51] Int. Cl.³ .............................................. C03D 37/02
[52] U.S. Cl. ................................................ 65/1; 65/2; 65/374 M; 13/6; 13/25
[58] Field of Search ................... 65/1, 374 R, 2; 13/6, 13/25, 35

[56] References Cited

U.S. PATENT DOCUMENTS

| | | | |
|---|---|---|---|
| 3,350,182 | 10/1967 | Hunter et al. | 65/1 |
| 4,052,339 | 10/1977 | Costin | 13/35 X |

*Primary Examiner*—Robert L. Lindsay, Jr.
*Attorney, Agent, or Firm*—Ronald C. Hudgens; Robert F. Rywalski; Charles F. Schroeder

[57] ABSTRACT

There is disclosed a glass feeder, or bushing, for forming fibrous glass products with the bushing being fabricated of chromic oxide which has been doped with an electrical conductivity enhancing amount of a dopant.

6 Claims, No Drawings

FIBROUS GLASS MANUFACTURE USING REFRACTORY BUSHING

THE INVENTION

The present invention relates to the art of glass manufacturing and, and more particularly, relates to the art of manufacturing fibrous glass products by employing an electrically heated bushing, or glass feeder.

Fibrous glass products, for example textile fibers, have long been manufactured by a process involving the use of a bushing or glass feeder. The feeder is adapted to maintain a pool of molten glass therein and includes a bottom wall containing a plurality of orifices from which streams of molten glass issue. These streams are then attenuated into fibers as, for example, by drawing them and winding them on a winding drum. The bushings are directly, electrically heated by passing current therethrough. Typically this is done by providing the sidewalls of the bushing with electrical terminals, or tabs which are respectively attached to the connectors of an appropriate electrical circuit. Thus, by passing current through the bushing the bushing is resistively heated so as to maintain the glass in a molten condition. In a most common procedure, the bushing is attached by conventional means to a forehearth channel which continuously supplies molten glass to the bushing and then fibers are continuously formed from the streams issuing from the bushing.

Commercially, the above type process has been practiced by employing bushings made of precious metals. While these bushings have many beneficial characteristics, one their most obvious drawbacks is their high cost and the capital required to maintain an adequate inventory thereof.

Thus, it is an object of this invention to improve processes and apparatus of the foregoing type by providing for a bushing which can be easily and cheaply manufactured and which is fabricated of materials which are inexpensive relative to previously employed precious metals.

Thus, in accordance with this invention, there is provided an improvement in processes of the foregoing type and in the glass feeders employed therein with the improvement residing in employing a bushing which is fabricated of chromic oxide ($Cr_2O_3$) which has been doped with a sufficient amount of a dopant to increase its electrical conductivity.

U.S. Pat. No. 3,350,182 discloses silicon carbide bushings mounted in a resistance heating element. The patent indicates that it is possible to use silicon carbide as a heating element and as a bushing by doping to the desired resistivity. U.S. Pat. No. 4,052,339, which is hereby incorporated by reference, discloses the doping of refractories, for example, chromic oxide to alter the electrical conductivity of the refractory. Co-pending application U.S. Ser. No. 853,055, filed by Messrs. Hinze and Costin (now U.S. Pat. No. 4,140,507) discloses a composite bushing which may be adapted for electrical heating with the composite bushing including a portion of chromic oxide which serves to prevent reaction between silicon based ceramic and platinum metal tips. None of the foregoing however, have any recognition of the present invention.

The bushings contemplated herein may be manufactured by conventional techniques employed for fabricating refractory materials. For example, the bushings may fabricated by casting in the manner set forth in U.S. Pat. No. 4,052,339. The chromic oxide which will be employed will be substantially pure; that is, it will typically be at least 99.5% $Cr_2O_3$. Such chromic oxide is then admixed with the dopant and a slip made from which the bushings may be cast. The slip is then heated so as to provide a unitary, or one piece, bushing. The dopant will be employed in an electrical conductivity enhancing amount, generally in the range of several tenths of a percent, for example 0.2 or 0.3% by weight up to on the order of about 5.5 percent by weight. Magnesium oxide is a preferred dopant. Desirable results are realized in forming textile type glass fibers by fabricating the bushing from about 99.5% by weight of a $Cr_2O_3$ material, having a purity level on the order of about 99.9% by weight, and 0.5% by weight of a magnesium oxide powder, having a purity on the order of about 99.9% by weight.

Suitable dopants as contemplated herein for admixture with chromia are compounds having a cationic portion, or moiety, with a valence of one or two and an ionic radius which is within about 15% of the ionic radius of chromium. Exemplary of such cationic portions, or moieties, are those of lithium, magnesium, manganese, iron, cobalt, nickel, copper and zinc. Exemplary anionic moieties of such compounds are oxides, halides, sulfates, carbonates, and nitrates.

By substituting the presently contemplated bushings in the processes, and apparatus, of the prior art, it will be apparent the economies will by greatly realized because of the significantly lower cost of the bushing. Additionally, the maintaining of a pool of glass in the bushing will be expedited because of the enhanced electrical conductivity of the chromic oxide and it will be found that the bushings of the present invention have outstanding resistance to the corrosive and erosive action of molten glass. Hence such bushings exhibit a long operating life.

While the above sets forth the invention so as to enable those skilled in the art to make and use same, it will be apparent that modifications are possible which, pursuant to the patent statutes and the laws do not depart from the spirit and scope thereof.

I claim:

1. In a process for producing glass fibers comprising: electrically heating a bushing so as to maintain a pool of molten glass therein, and attenuating a glass stream issuing from said bushing into a glass fiber, the improvement wherein said bushing is fabricated of chromic oxide which has been doped with a sufficient amount of a dopant to increase its electrical conductivity said dopant is a compound having a cationic moiety with a valence of 1 or 2 and an ionic radius which is within about 15% of the ionic radius of chromium and an anionic moiety selected from the group consisting of oxides, halides, sulphates, carbonates and nitrates.

2. The improvement of claim 1 wherein said dopant is MgO.

3. The improvement of claim 1 wherein said anionic moiety is a halide.

4. The improvement of claim 1 wherein said anionic moiety is a sulfate.

5. The improvement of claim 1 wherein said anionic moiety is a carbonate.

6. The improvement of claim 1 wherein said anionic moiety is a nitrate.

* * * * *